(12) United States Patent
Tarlton et al.

(10) Patent No.: US 6,462,665 B1
(45) Date of Patent: Oct. 8, 2002

(54) METHOD AND APPARATUS FOR SENDING A WEATHER CONDITION ALERT

(75) Inventors: Peter B. Tarlton, Oceanport, NJ (US); Daniel P. Millerick, Old Bridge, NJ (US); Craig R. Walters, Poughkeepsie, NY (US)

(73) Assignee: Wheelock, Inc., Long Branch, NJ (US)

( * ) Notice: Subject to any disclaimer, the term of this patent is extended or adjusted under 35 U.S.C. 154(b) by 0 days.

(21) Appl. No.: 09/571,447

(22) Filed: May 16, 2000

(51) Int. Cl.$^7$ ................................................ G01W 1/00
(52) U.S. Cl. ........................ 340/601; 340/539; 340/690; 340/7.48; 340/7.5; 73/170.16; 73/384; 455/186.1; 702/3
(58) Field of Search ................................ 340/601, 905, 340/311.2, 690, 539, 7.48, 7.5; 702/3; 73/170.16, 384; 455/186.1

(56) References Cited

U.S. PATENT DOCUMENTS

| | | | |
|---|---|---|---|
| 3,603,951 A | 9/1971 | Bracken et al. | 340/224 |
| 3,701,024 A | 10/1972 | Knowles et al. | 325/364 |
| 3,921,074 A | 11/1975 | Baird | 325/303 |
| 4,347,618 A | 8/1982 | Kavouras et al. | 375/37 |
| 4,956,875 A | 9/1990 | Bernard et al. | 455/13 |
| 5,121,430 A | 6/1992 | Ganzer et al. | 380/48 |
| 5,574,999 A | 11/1996 | Gropper | 455/186.1 |
| 5,628,050 A | 5/1997 | McGraw et al. | 455/12.1 |
| 5,742,235 A * | 4/1998 | Miche | 340/690 |
| 5,781,852 A | 7/1998 | Gropper | 455/227 |
| 5,848,378 A | 12/1998 | Shelton et al. | 702/3 |
| 5,910,763 A * | 6/1999 | Flanagan | 340/690 |
| 5,943,630 A | 8/1999 | Busby et al. | 702/3 |
| 5,949,851 A | 9/1999 | Mahaffey | 379/48 |
| 5,978,738 A | 11/1999 | Brown | 702/3 |
| 5,990,805 A * | 11/1999 | Wicks et al. | 340/825.44 |
| 6,104,582 A * | 8/2000 | Cannon et al. | 361/1 |
| 6,112,074 A * | 8/2000 | Pinder | 455/404 |
| 6,121,885 A * | 9/2000 | Masone et al. | 340/628 |
| 6,177,873 B1 * | 1/2001 | Cragun | 340/601 |
| 6,232,882 B1 * | 5/2001 | Hed et al. | 340/601 |
| 6,255,953 B1 * | 7/2001 | Barber | 340/601 |
| 6,278,375 B1 * | 8/2001 | Hucker | 340/601 |
| 6,295,001 B1 * | 9/2001 | Barber | 340/601 |

FOREIGN PATENT DOCUMENTS

GB 2098833 A 11/1982 .......... H04B/17/00

OTHER PUBLICATIONS

US 5,867,805, 2/1999, Brown (withdrawn)
"Weather Information Display System" from SmartRAD promotional material, *WeatherData Incorporated.*
"The Business–To–Business Storm Warning Solution" from SkyGuard promotional material, *WeatherData Incorporated.*
"WeatherPager" www.weatherpager.com.
Web Search Results.

* cited by examiner

Primary Examiner—Daniel J. Wu
(74) Attorney, Agent, or Firm—Moser, Patterson & Sheridan, LLP; Kin-Wah Tong

(57) ABSTRACT

A method and apparatus of an alert system for notifying subscribers of weather or hazardous conditions. A weather-tracking source or service broadcasts weather or hazardous conditions across the nation to alert the general public of potentially dangerous climatic and hazardous conditions that may arise from time to time. A weather service provider receives the weather condition broadcasts from the weather-tracking source or service and transmits weather or hazardous condition signals to subscribers having an alert unit. The alert unit is a passive device capable of receiving and warning the subscribers of the weather or hazardous condition broadcasts.

14 Claims, 10 Drawing Sheets

METHOD AND APPARATUS FOR SENDING A WEATHER CONDITION ALERT

The present invention relates to a method and apparatus for distributing warning alerts, e.g., severe weather condition alerts. More particularly, the invention relates to a method and apparatus for notifying the public of severe weather conditions.

BACKGROUND OF THE DISCLOSURE

Communities throughout our nation have suffered from various severe weather conditions, which may arise from time to time. These severe weather conditions typically include thunderstorms, flooding, hurricanes, tornadoes, winter weather, tsunamis, fire, and other climatic events. Additionally, hazardous conditions such as seismic, nuclear, chemical, or gaseous spill, or otherwise, have also threatened large populations of people, wildlife, and property alike. Our nation's ability to track and warn the general public has helped to minimize loss of life and property from natural disasters.

Federal and state agencies have funded various organizations to track our weather both domestically and abroad. As such, the U.S. Government, through the Department of Commerce has established the National Oceanic and Atmospheric Administration (NOAA) to chart the oceans, the atmosphere and to warn of dangerous weather conditions. NOAA comprises several national service organizations, including the National Weather Service (NWS) and the National Environmental Satellite, Data, and Information Service (NESDIS), amongst other national service organizations. Each national service organization provides various functions including research, monitoring, data collection, analysis, and information dissemination, under the direction and coordination of NOAA.

The National Weather Service is the official United States communications means for issuing warnings during life-threatening weather conditions. The function of the NWS is evidenced in its mission statement "to provide weather, hydrologic, and climate forecasts and warnings for the United States, its territories, adjacent waters and ocean areas, for the protection of life and property and the enhancement of the national economy. NWS data and products form a national information database and infrastructure which can be used by other governmental agencies, the private sector, the public, and the global community."

The U.S. climatic conditions are tracked by the National Environmental Satellite, Data, and Information Service, which includes satellite operations. Satellites are a primary means to monitor weather patterns. One such satellite is a geostationary operational environmental satellite (GOES), which remains stationary over the continental U.S. to provide pictures of clouds, and gather other climatic information. The NWS utilizes the images and information gathered through the satellites to monitor for severe weather conditions. These pictures, plus other data are compiled by the NWS for analysis and issuance of warnings, as required. In an instance where severe weather conditions are observed, the NWS disseminates the climatic information through the Emergency Managers Weather Information Network (EMWIN). The EMWIN has been established to provide the emergency management community with access to a set of NWS warnings, watches, forecasts, and other products. The EMWIN broadcasts the information to the governmental, private sector and public entities. Thus, a general warning is sent out across specific mediums, and spectrums of bandwidth. Methods of disseminating climatic information include radio broadcast on VHF and UHF bands, postings on the Internet, and facsimile transmission to requesting entities. Additionally, EMWIN broadcasts may also be implemented via the GOES satellites. Satellite broadcasting is nationwide, and accessible by state and local entities to disseminate the data stream after receiving the downlink.

Although such broad regional broadcasts are very helpful, these broadcasted warnings are not locally focused or directed. Namely, the broadcast warnings issued by the NWS contain broad regional warnings that may affect numerous local communities or counties, ranging up to hundreds of miles. Such large regional broadcasting causes a local population to become complacent over time, due to reception of a high number of warnings, that in practice, may only affect a much smaller area than the broad region directed by the NWS broadcasts.

For example, over time, a population in "tornado alley" (a large area in the middle of the United States) may become complacent over receiving a tornado watch warning, since so many of such warnings are issued during the course of a tornado season. Thus, such complacency have caused many people to suffer from weather related injury, not because of a lack of warning, rather from not heeding to such warnings due to many overly broad "false" warnings. Such shortcomings are particularly detrimental where weather patterns change abruptly, as in the instances of tornadoes and thunderstorms, which may suddenly affect a very small area within a much larger broadcasting region.

Additionally, the reaction time to provide a localized warning to a targeted region may be extremely short. For example, if a tornado has suddenly "touched down", there is very little time to distribute the heightened severe weather condition to a large group of affected individuals on a personal basis, i.e., having a long list of telephone numbers to call. Given the small reaction time, a large group of affected individuals must be notified quickly with sufficient time to react to a particular hazardous condition.

Thus, there is a need to provide a local warning system that will quickly notify a group of individuals within an affected area of severe weather conditions, on a current and personalized basis.

SUMMARY OF INVENTION

The disadvantages heretofore associated with the prior art are overcome by the present invention of a method and apparatus of an alert system for notifying subscribers of weather or hazardous conditions. A weather-tracking source or service broadcasts weather or hazardous conditions across the nation to alert the general public of potentially dangerous climatic and hazardous conditions that may arise from time to time. In one embodiment, a weather service provider receives the weather condition broadcasts from the weather-tracking source or service and transmits weather or hazardous condition signals to identified subscribers having an alert unit. The alert unit is a passive device capable of receiving and warning the identified subscribers of the weather or hazardous condition broadcasts.

The passive alert unit utilizes various warning devices that provide visual and/or audible sensory signals, such as a strobe light and a piezoelectric horn. In one embodiment, the passive alert unit will only activate when a monitored hazardous condition has reached a level that a subscriber has indicated that he or she needs to be notified. Namely, subscribers that are more risk adverse will be notified immediate upon detection of even minor weather conditions, whereas subscribers that are more risk tolerant will be notified only upon detection of more severe weather conditions as specified by the subscribers. Thus, the present inventive system averts the subscriber from becoming complacent from receiving numerous non-relevant warnings, by providing very localized and personalized warnings. In this manner, a subscriber is personally warned of a severe weather or hazardous condition that is localized and categorized for that particular subscriber, thereby allowing the subscriber to take the precautionary steps.

Additionally, the subscriber alert units are notified via a wireless broadcast. In one embodiment, the wireless broadcast is implemented by using "region-based" paging. Namely, a small number of paging numbers are assigned geographically, where upon sending a warning signal via one paging number will effect notification of a large number of the subscriber alert units within the region defined for that particular paging number. This communication architecture allows cost effective and rapid notification of a large group of subscribers of rapidly changing weather condition, thereby providing the subscriber with sufficient time to take the necessary precautionary steps.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
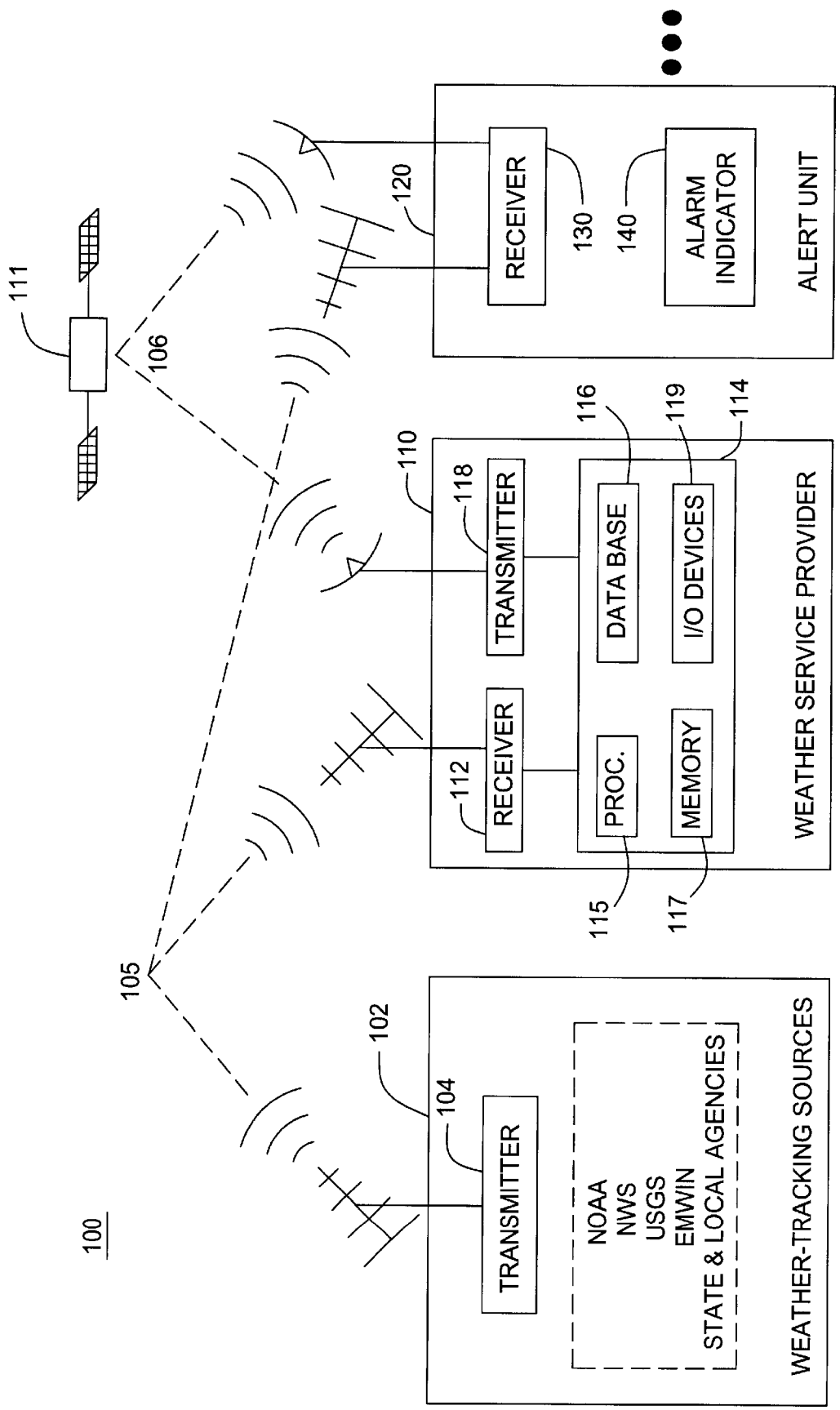
FIG. 1 depicts a block diagram of an alert system of the present invention.

FIG. 1 depicts a block diagram of an alert system of the present invention. A weather condition alert system 100 comprises a weather-tracking service 102, a weather service provider 110, and one or more subscriber alert units 120.

Specifically, the weather service provider 110 receives broadcast information from various weather-tracking services 102. Moreover, in an instance where severe weather or hazardous conditions approach particular regions or communities of the U.S., the weather service provider 110 broadcasts a personalized warning message through a wireless transmission channel 106, to subscriber alert units 120 of subscribers requesting to be alerted of such severe weather conditions. The alert unit 120 comprises a receiver 130 to receive the warning message and an alarm indicator 140 to actively alert each subscriber of the severe weather conditions using audible and/or visual devices. The subscriber alert unit 120 is a passive device, i.e., its activation is achieved without any proactive input by the subscriber.

In particular, a plurality of weather-tracking sources or services 102 comprise a plurality of transmitting equipment 104 capable of broadcasting climatic and hazardous condition information across large regions of the United States. Such weather-tracking sources 102 may include, the National Oceanic and Atmospheric Administration (NOAA), and NOAA sub-organizations, including the National Weather Service (NWS) and the Emergency Managers Weather Information Network (EMWIN), the U.S. Geological Survey (USGS), and any other federal, state or local source that distributes climatic and hazardous information. The weather-tracking sources 102 broadcast climatic conditions through multiple broadcast channels 105, including satellite broadcast, Internet posting, and facsimile to those organizations and individuals having corresponding equipment to receive weather related information through the available broadcast channels 105.

The weather service provider 110 comprises receiving equipment 112 capable of receiving via the broadcast channels 105, weather information transmitted by the weather-tracking sources 102. Furthermore, the weather service provider 110 comprises transmitting equipment 118 capable of disseminating weather information through the transmission channel 106. A computer system 114 is coupled to both the receiving equipment 112 and the transmitting equipment 118 to expediently track and disseminate climatic information. The computer system 114 comprises a central processing unit (CPU) 115, memory 117, and I/O devices 119 such as a disk drive, keyboard or otherwise (not shown). Additionally, the computer system 114 further comprises a database 116. The database 116 is used for storing subscriber information, via various information fields. Such information may include subscriber information such as the subscriber's name, the type of warning each subscriber has selected to be warned about, a warning level (weather or hazardous condition threshold level) or category, and/or a pager number zone for each subscriber.

In one embodiment, in order for a severe warning condition to be transmitted to a subscriber by the weather service provider 110, the severe warning level or condition must match the warning level or category selected by the subscriber. The warning level or category may also be tailored in accordance with the time of day, e.g., a higher warning level may be set for evening hours as compared to the day time.

For example, a subscriber living in the "tornado alley" in the Midwest U.S. may select a warning level for a NWS broadcast of a "tornado watch". Another subscriber may decide to receive an alert only when the NWS issues a "tornado warning". Moreover, subscribers (with a higher tolerance for risk) may only want to receive an alert for a tornado when there has been a confirmed sighting in the general vicinity of the subscriber's receiver location (e.g., home, office, or other areas of congregation).

In the preferred embodiment, the weather service provider 110 disseminates the severe weather conditions via a wireless system, e.g., a paging type system having dedicated frequencies for transmission. A wireless system can be broadly interpreted to include transmission system such as paging systems, cellular phone systems, satellite communication systems and the likes.

After the weather service provider 110 receives a severe weather condition, the computer system 114 searches the database 116 for subscribers likely to be affected by the severe weather condition. Furthermore, the database 116 is queried for a corresponding warning level or category (if any), which qualifies the subscriber for receiving the warning signal.

After determining the qualified subscribers, the transmitter 118 of the weather service provider 110 uplinks a pager type signal to a pager satellite 111, which then downlinks the signal to the subscriber alert unit 120 at each subscriber location. Thus, the system does not require any proactive input by the subscriber to receive an alert.

For example, if the NWS broadcasts a severe hailstorm in Michigan during the middle of the night, qualified subscribers of the weather service provider 110 will receive a personalized warning on their respective alert units 120. This alert will provide the subscriber additional time to prepare for such severe weather conditions, in the event such hailstorm traverses the subscriber's location.

Figure 2:
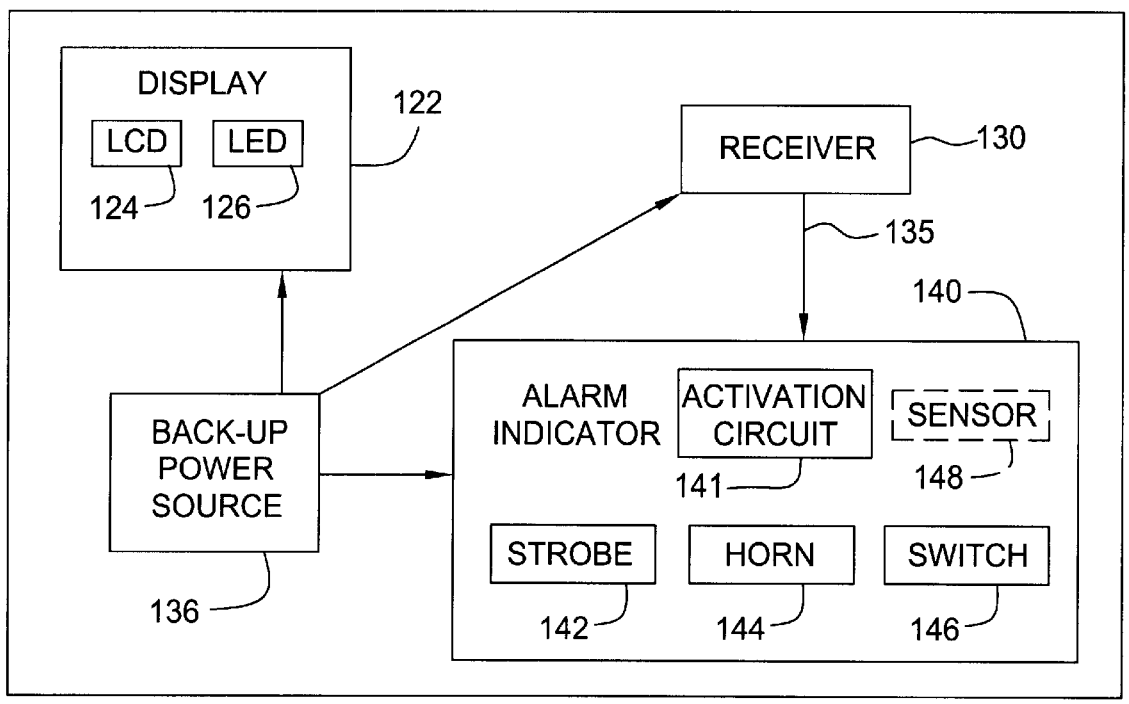
FIG. 2 depicts a block diagram of an alert unit.

FIG. 2 depicts a block diagram of a subscriber alert unit 120. In a preferred embodiment, the alert unit 120 comprises a receiver 130, an alarm indicator 140, a display 122 and a back-up power source 136. The receiver 130 is capable of receiving pointcast transmissions from a weather service provider 110. The weather service provider 110 transmits signals containing alphanumeric information via the pager satellite 111 to the alert unit 120. Upon receiving the transmission from the weather service provider 110, the receiver 130 activates the alarm indicator 140 to notify the subscriber.

The receiver 130 may be a conventional receiver capable of receiving broadcast, narrowcast or pointcast information from the weather service provider 110. In the preferred embodiment, a pager receiver is utilized. However, a person skilled in the art will recognize that other wireless receiving embodiments may be adapted to the alert unit 120 to receive transmissions from a weather service provider.

A conventional 115V, 60 Hz, A/C voltage, supplied by the local power companies to home and office locations, provides power to the alert unit 120. As such, the alert unit 120 comprises a standard two or three prong plug for insertion into a standard wall outlet. A conventional DC battery 136 (e.g., standard 9-volt battery) is coupled to the receiver 130 and alarm indicator 140 for back-up power in the event of a power failure at the subscriber's home or office location. The battery may also be a rechargeable battery, and must store enough potential energy to produce a current to sustain prolonged reception capabilities and initiate an alert signal.

Figure 8:
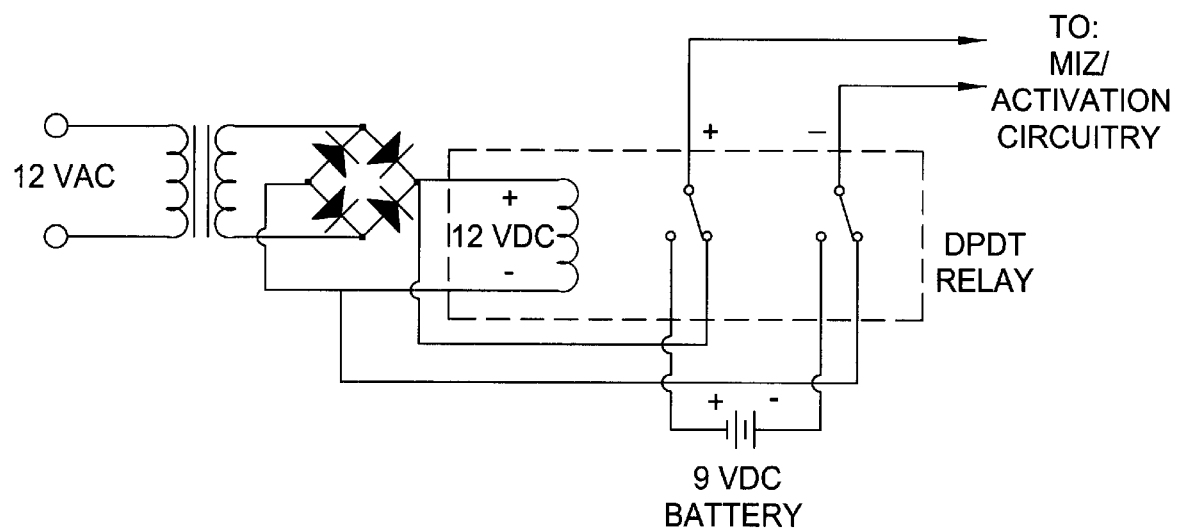
FIG. 8 depicts a schematic of an illustrative circuit for isolating a back-up battery.

FIG. 8 depicts a schematic of an illustrative circuit for isolating a back-up battery. Namely, the present inventive alert device may incorporate a battery backup circuit, which allows for isolation of the battery from the receiver 130 and alarm indicator 140 of the alert unit 120. The illustrative back-up circuit allows for enhanced shelf life of a non-rechargeable battery 136. A momentary switch (not shown) may be used to interrupt power for testing of the battery 136.

Furthermore, the subscriber alert unit 120 further comprises a display 122 having a screen such as a liquid crystal display (LCD) 124 with an optional lighting device (not shown) for reading under poor lighting conditions. The display screen 122 is capable of displaying the alphanumeric symbols transmitted by the weather service provider 110. Such alphanumeric symbols that are displayed on the LCD 124 include one or more of the following information: the type of severe weather or hazardous condition, classification (if any), direction of path, and the current time, or otherwise.

Figure 3:
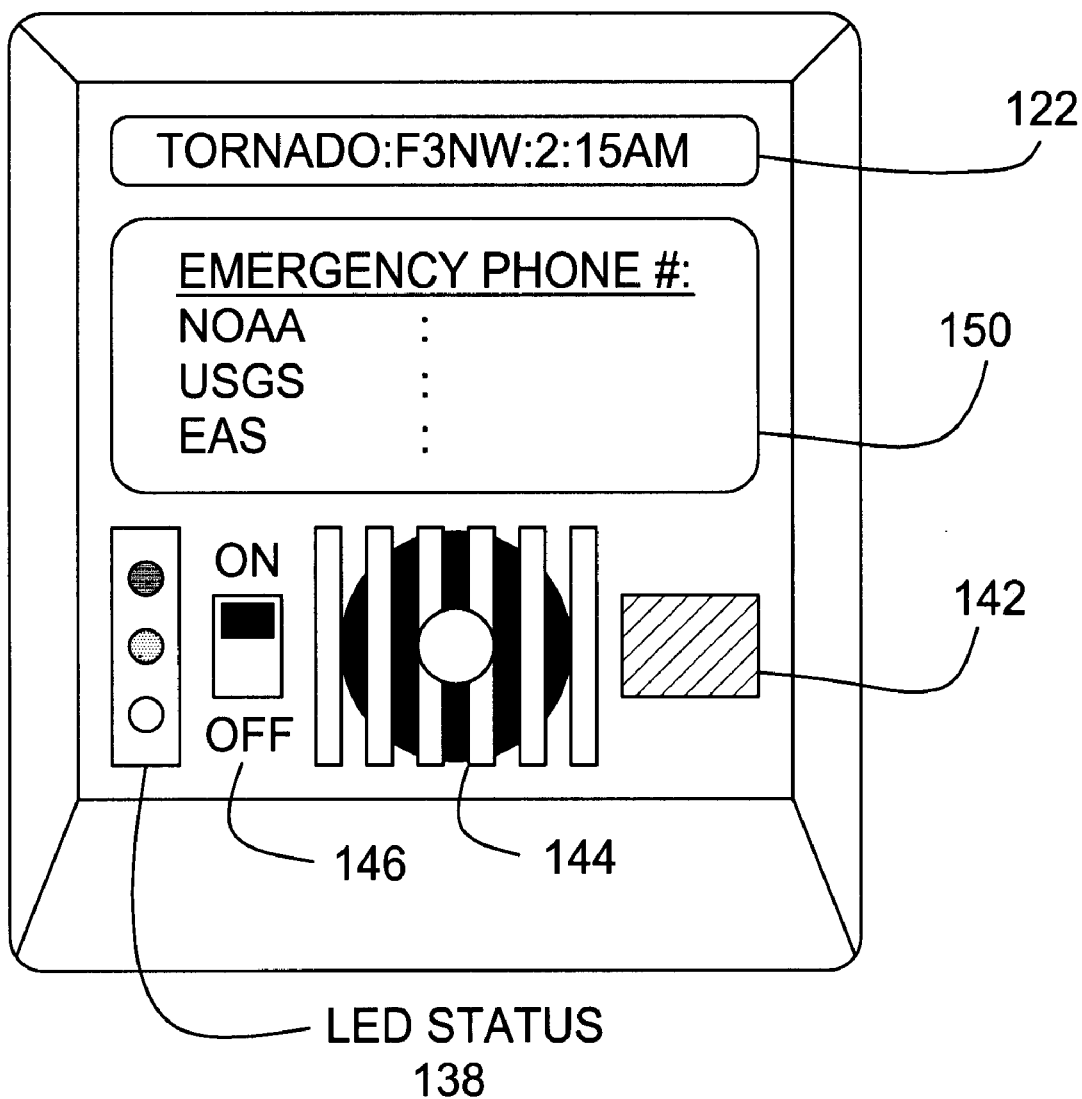
FIG. 3 depicts an illustrative front view of the alert unit.
Figure 4:
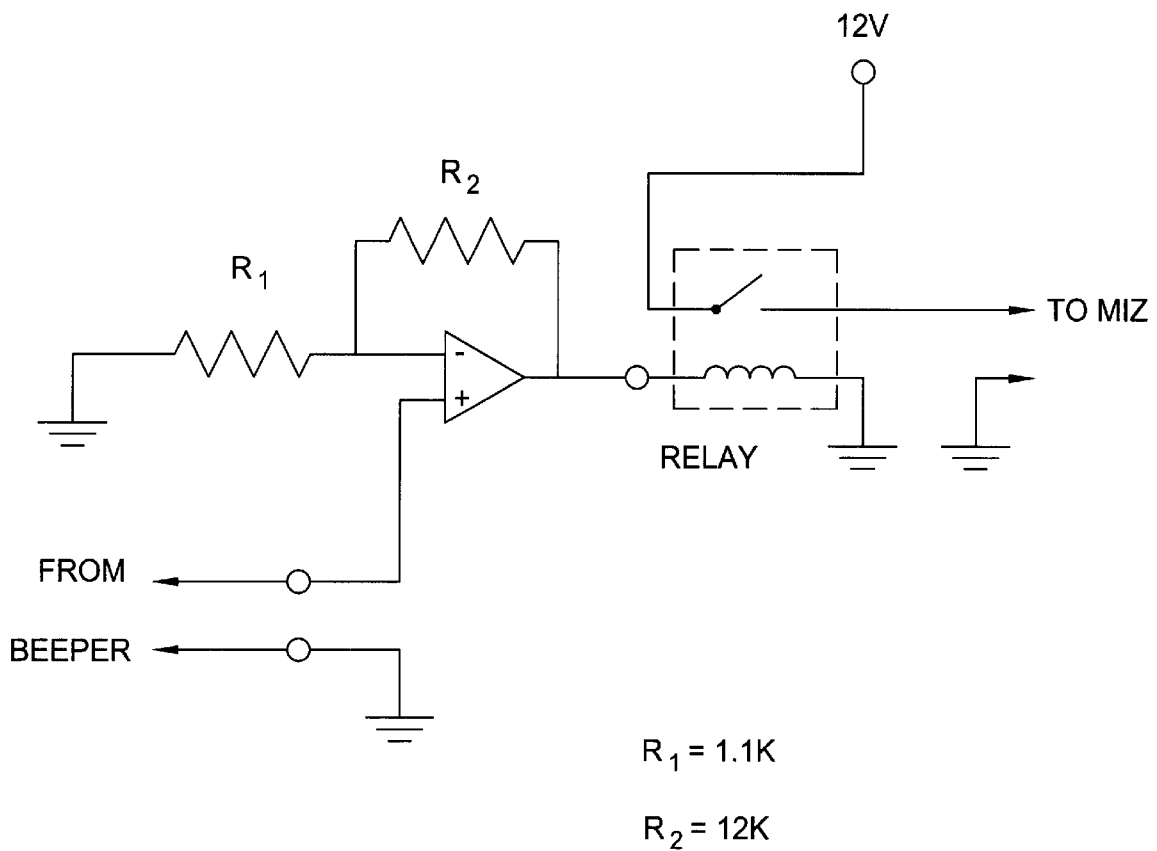
FIG. 4 depicts a first embodiment of an activation circuit for the alert unit.
Figure 5:
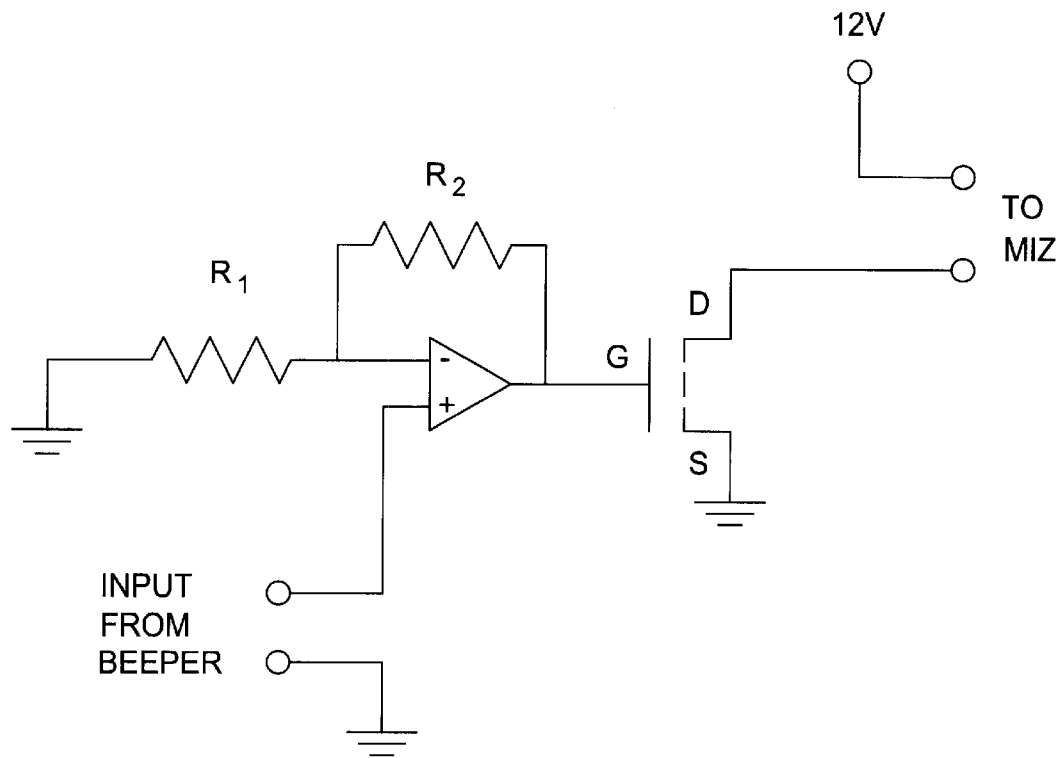
FIG. 5 depicts a second embodiment of an activation circuit for the alert unit.
Figure 6:
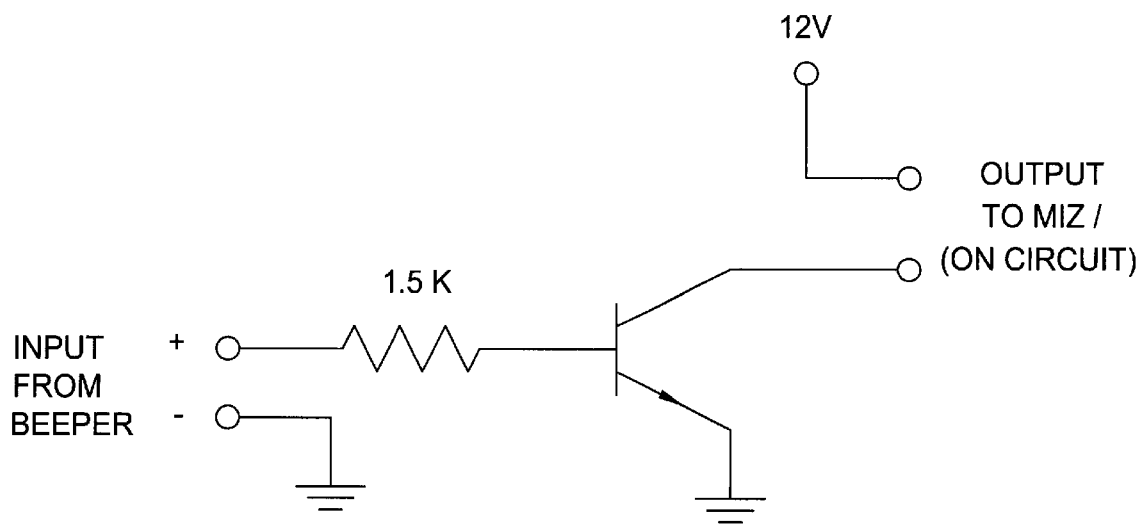
FIG. 6 depicts a third embodiment of an activation circuit for the alert unit.
Figure 7:
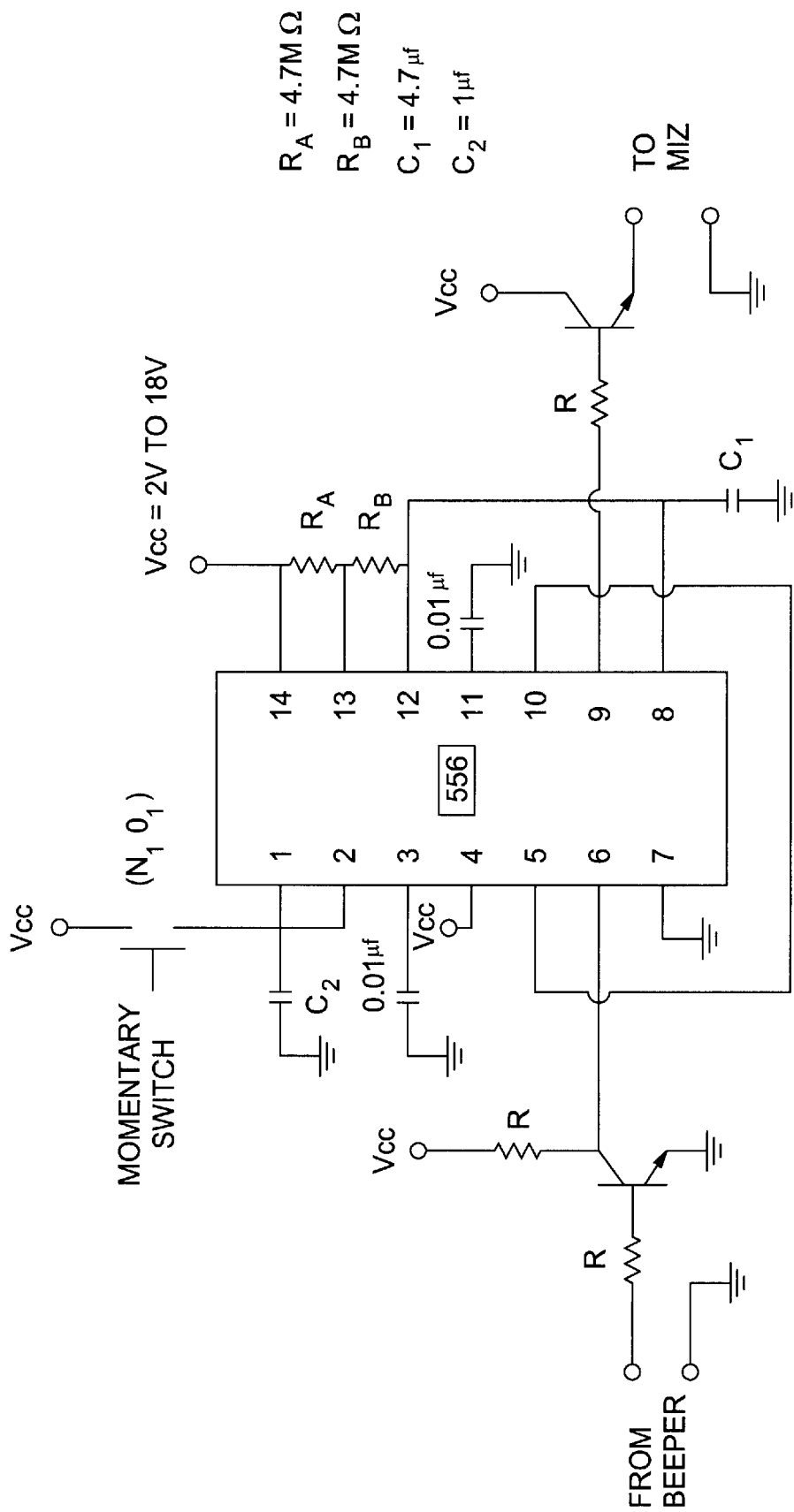
FIG. 7 depicts a fourth embodiment of an activation circuit for the alert unit.

FIG. 3 depicts an illustrative front view of the alert unit. For example, the display screen 122 depicts alphanumeric text reciting "Tornado: F3NW: 2:15am", signifying a tornado warning having a F3 classification, traveling from the north west direction. The time, 2:15am, may represent the current time or the latest received time the alert signal was transmitted. Abbreviations and codes may vary, depending on the text to be displayed and the size of the LCD 124. The alert unit 120 may also provide space on the outer case of the alert unit 120 to provide reference information 150 such as emergency phone numbers, Internet addresses, or otherwise that the subscriber may wish to contact for further severe weather or hazardous condition information.

Additionally, multicolored LEDs 126 may be utilized to designate the status of the alert unit 120. Such LEDs may receive their low current signals from the receiver 130. For example, a green lighted LED may signify that there is external power going into the alert unit 120 from either the wall plug 134 or the battery 136 and there is no alert being broadcasted from the weather service provider 110. A blinking green lighted LED may signify that the alert unit 120 is not receiving any power and is currently operating with battery backup. A yellow-lighted LED may signify that a warning is being broadcasted from the weather service provider 110, but does not pertain to a particular subscriber at this time, (e.g., not pertaining to the specific user, but to a general area). A red LED may signify that a severe weather condition transmission from the weather service provider 110 is currently being received, and is applicable to a particular subscriber. Blinking green and yellow LEDs may signify subscription renewal is in order. Blinking green, yellow, and red LEDs may signify subscription has been canceled and that no notification will be made to the subscriber's alert unit. No Lighted LEDs may signify no power from any source including the battery backup. Moreover, combinations of the lighted LEDs 126 may be adapted to signify other conditions, as required.

The alarm indicator 140 is coupled to an output of the receiver 130 via a signal path 135. Signal path 135 is used as a path for activating the alarm subassembly 140. The alarm indicator 140 comprises an activation circuit 141. The activation circuit 141 is used to produce a signal to activate a plurality of warning devices in response to being triggered by the receiver 130, though the signal path 135. FIGS. 4–7 depict various embodiments of the activation circuitry 141 of the alert unit 120. The activation circuit 141 may illustratively comprise a relay circuit, a MOSFET circuit, discrete transistor circuit, or integrated circuits, as shown in FIGS. 4–7, respectively.

The plurality of warning devices may include a strobe light 142, and a horn 144, such as a piezoelectric horn. The horn 144 must be capable of producing a sound sufficiently loud (typically 90 dB at 10 feet) to notify the inhabitants that may be sleeping, of a severe weather condition alert. Additionally, an On/Off switch 146 may be provided to allow the subscriber to manually switch off the strobe light 142 and/or the horn 144 after being activated. Additionally, the activation device 141 may vary the intensity of the light of the strobe 142 and/or the sound of the horn 144.

Furthermore, a sensor 148 is optionally provided, such as a vibration sensor for alerting the subscriber of seismic activity. Moreover, the sensor may be adapted to include other sensing devices such as a thermometer, barometer, or otherwise, for sensing and alerting the subscriber of various climatic conditions.

In an alternate embodiment, the functions performed by the alert unit 120 can be implemented into a voice evacuation system (voice EVAC) or part of a larger emergency evacuation system. Currently, various voice evacuation systems are available that are designed for selective and general alerting, e.g., Wheelock's SAFTPATH® supervised audio, fire and emergency evacuation system. These audio EVAC systems are typically deployed in commercial establishments or facilities such as factories, processing plants, warehouses and institutional facilities. These systems employ speakers and pre-recorded voice messages to provide distinctive signaling. Thus, the present invention allows the facility manager of a commercial establishment to subscribe to the warning services provided by the weather service provider 110. In doing so, the existing audio EVAC system of a commercial facility can be exploited to perform the alerting functions of the alert unit 120.

Figure 10:
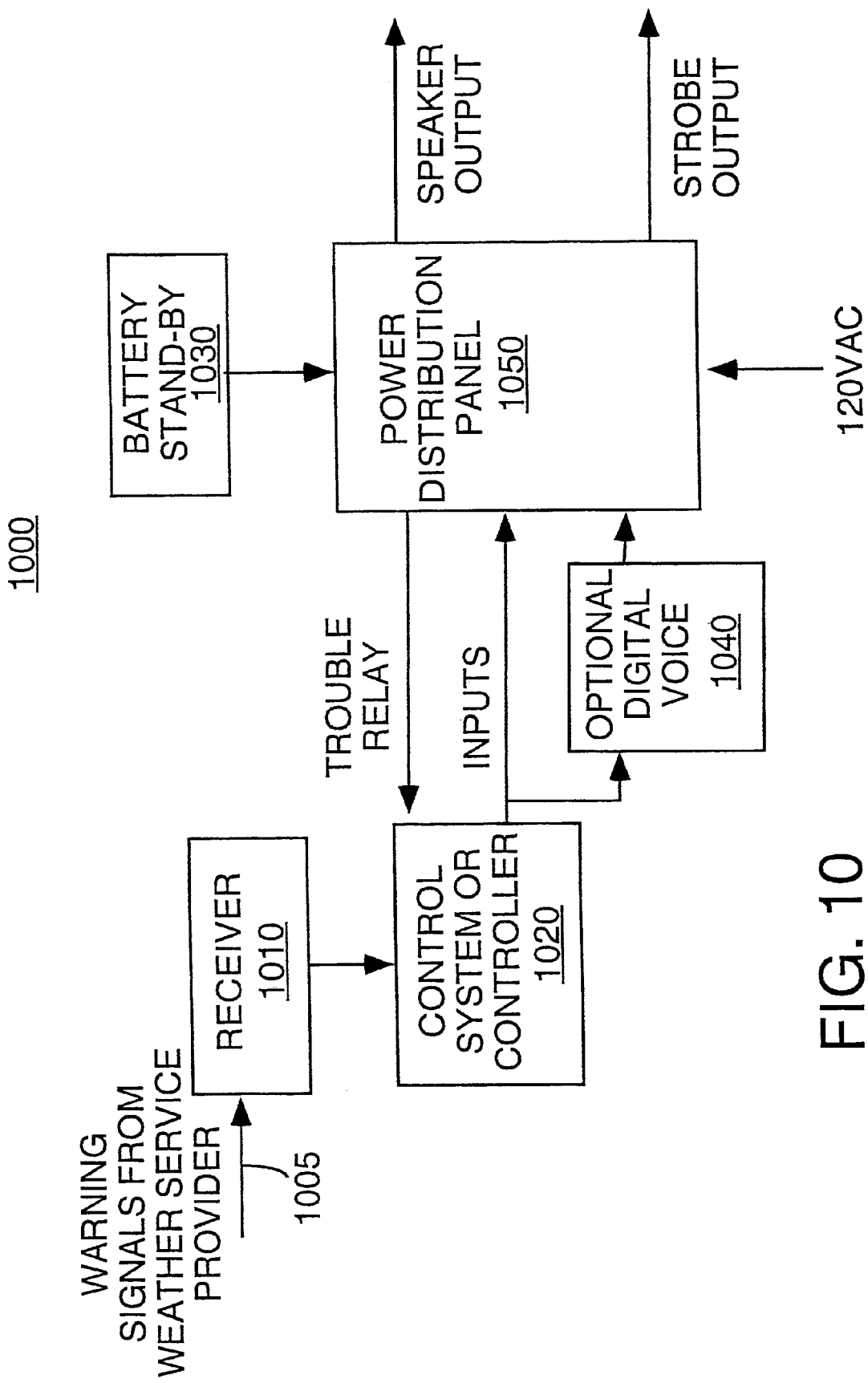
FIG. 10 depicts a block diagram of a voice evacuation system.

FIG. 10 illustrates a block diagram of an illustrative voice evacuation system EVAC 1000. The EVAC 1000 comprises a receiver 1010, a controller 1020, a power distribution panel 1050, a battery stand-by or backup source 1030 and an optional digital voice module 1040.

In operation, warning signals from the weather service provider 110 on path 1005 are received by the receiver 1010. The warning signal is passed to the controller 1020 for processing. If the controller determines that the warning signal from the weather service provider warrants an announcement, the proper signal is forwarded to the power distribution panel 1050 which, in turn, generates the appropriate speaker and/or strobe outputs. Optionally, pre-recorded messages can be stored in the optional digital voice module 1040, where the stored messages can be forwarded to the speaker for broadcasting to the workforce, e.g., "The National Weather Service has issued a tornado warning for our area".

Figure 9:
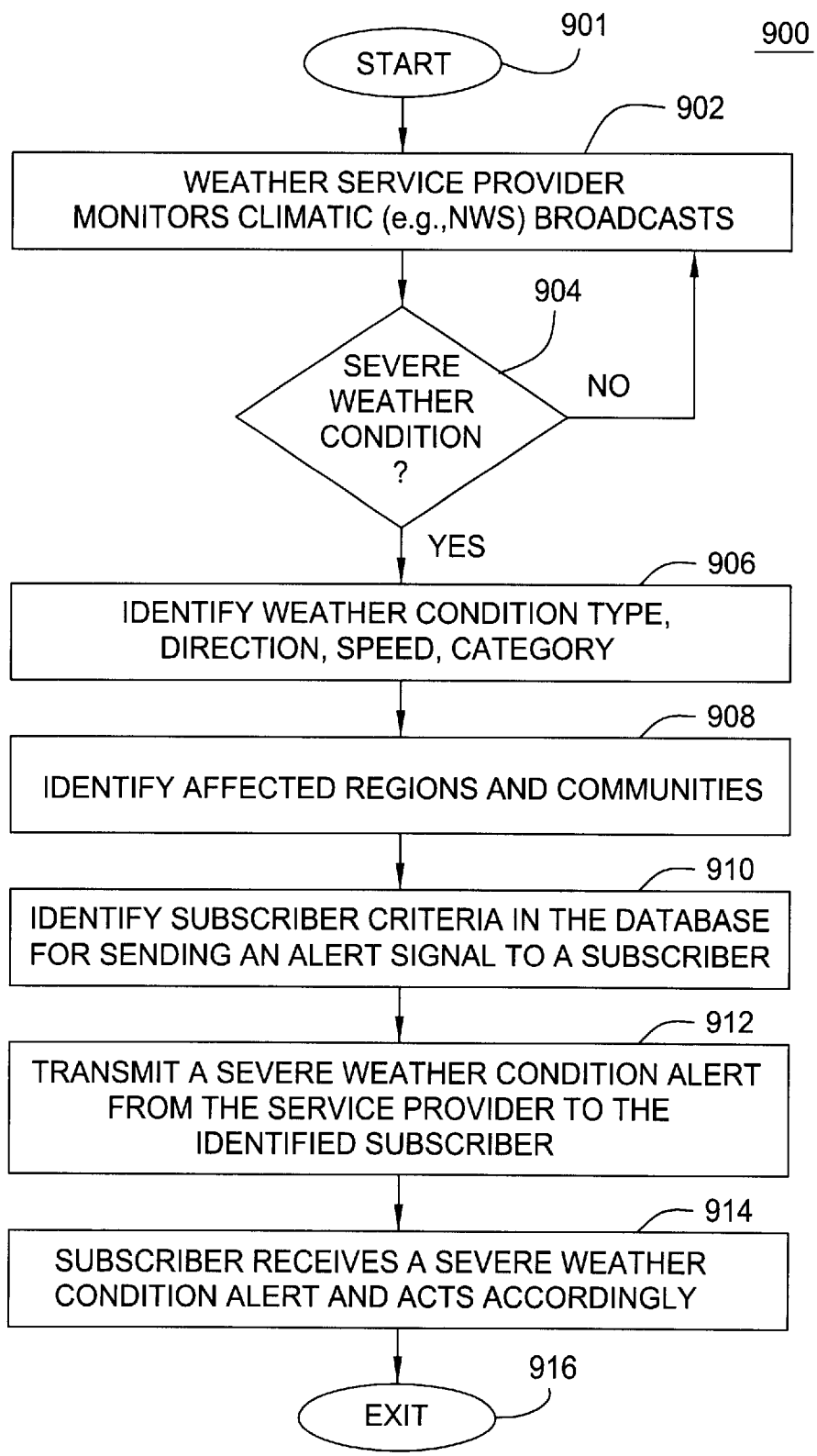
FIG. 9 depicts a flow diagram of a method for sending and receiving a weather condition alert, in accordance with the present invention.

FIG. 9 depicts a flow diagram of a method 900 for sending and receiving a weather condition alert in accordance with the present invention. The method begins at step 901, and proceeds to step 902 where a weather service provider 110 monitors climatic broadcasts from various weather-tracking services 102, such as the National Oceanic and Atmospheric Administration (NOAA) and the National Weather Service (NWS).

In step 904, the weather service provider queries if a severe weather condition broadcast has been received. If the query is negatively answered, i.e., no severe weather condition exists, then method 900 returns to step 902, where the weather service provider 110 continues to monitor the broadcasted weather information.

If the query is positively answered, i.e., where a severe weather condition is broadcasted by the weather-tracking services, then the method proceeds to step 906. In step 906, the weather service provider 110 identifies the parameters of the severe weather condition, including but not limited to, type of weather condition, category (if any), location, direction of travel, speed, and any other weather related parameters that are made available by the weather-tracking services 102. From the data generated in step 906, the weather service provider 110, in step 908, identifies the region and potential communities that are currently and potentially adversely affected by the severe weather conditions.

In step 910, the service provider searches a database for subscribers who have previously requested to be alerted of such specific types of potential harm. Subscribers may set criteria for receiving alerts from the weather service provider. For example, a subscriber may not desire to be warned of approaching thunderstorms, strong winds and rain, unless they are categorized by the weather-tracking services above a certain threshold, e.g., a category 3 type and above tropical storm. If the weather conditions and database criteria of the subscriber match, then the subscriber qualifies to receive a transmitted alert signal.

In step 912, the weather service provider transmits an alert signal containing alphanumeric information regarding the severe weather condition, to the identified subscribers. The computer system may incorporate graphic user interfaces (GUI) (e.g., icons) as a tool to allow an operator of the weather service provider to quickly and efficiently alert a large number of subscribers. Since the weather service provider is alerting large numbers of people/alert units at the same time, the alert unit phone numbers required may be grouped by county or zones. In the preferred embodiment, the weather service provider has a compiled listing of subscribers in a database who are sent a severe weather condition alert based upon subscriber selected criteria. Thus, a phone number for each particular subscriber is not required; rather, each subscriber may be assigned to a particular pager number for a geographic zone (a region-based paging number), as one of the subscriber criteria in the database.

For example, if there are 100,000 subscribers dispersed across the 23 counties of the state of New Jersey, and each alert unit phone number is capable of contacting 10,000 pagers, then 23 different alert unit phone numbers (i.e., 1 per county) are required. In turn, if five (5) warning levels or categories are available to the subscribers, then there are 5 unique pager numbers per county, thereby requiring a total of 115 pager numbers (i.e., 23 county phone numbers times 5 additional phone numbers). However, the required amount of phone numbers will vary depending on factors such as area codes, regional calling costs, number of subscribers in a county and the like. When the weather service provider receives information regarding a specific county, then a GUI icon for that county is activated, which automatically dials the specific phone number or numbers for transmitting a warning to the alert units in that county.

Alternatively, the subscribers within each county (or some predefined geographic region) can be further subdivided without the need of additional pager numbers. Using the example above with 23 pager numbers that correspond to 23 counties, the present invention can be adapted such that the codes sent to the alert units also contain "sub-region activation" information and/or warning levels information. For example, if a county is divided into four (4) sub-regions, then the codes representative of the "sub-region activation" information will contain four unique characters (e.g., 0–4 (4 representing all sub-regions) or N (north), E (east), S (south), W (west), A (all sub-regions). Thus, when a particular county pager number is dialed, all the alert units within that county will receive the "sub-region activation" information along with the pertinent weather alert information. If the alert unit is situated within the geographical location that corresponds to the "sub-region activation" information sent by the weather service provider, the alert unit will then activate to provide a warning. Otherwise, the "non-targeted" alert units within that county will still receive the weather alert information, but they will not activate to provide a warning.

Returning to FIG. 9, in step 914, the subscribers receive the transmitted alert signal on their alert unit, which initiates an alarm signal. The alarm signal may include a horn capable of producing a loud shrill, a strobe light, display screen having alphanumeric text describing parameters of the severe weather condition, or otherwise. At step 916, the subscribers have been personally notified of a severe weather condition, and the method ends.

Referring to FIG. 1, the present invention can be adapted to allow alternate sources for activating the alert unit 120. Activation may be provided through AM, FM, or seismic signal broadcasts from the weather-tracking services 102 directly, i.e., separate and apart from the service provider. For example, an alternate embodiment may include, the required bandwidth and frequency tuning in the receiver 130 to receive such AM, FM, or seismic signals transmitted by the weather service providers 102 (e.g., NOAA radio broadcasts). More specifically, a joint effort may be implemented with federal and local agencies to broadcast alert signals that may be utilized by the present alert units 120, without the need for a weather service provider 110. For example, the NOAA signal may be supplemented with a code that is recognized by the alert units 120. As long as the alert unit 120 has power, the alert unit 120 is capable of receiving information and producing a warning signal. Thus, the inventive alert unit 120 differs from a traditional receiver, since the alert unit 120 is always in an "on" state to directly receive warnings from a weather tracking source, without requiring interaction by any monitoring entity to forward such climatic or hazardous alert signals.

Furthermore, although the present invention discloses a weather service provider 110 that is tasked with determining which subscribers to alert, an alternate embodiment may be implemented such that the decision is made by the alert unit 120. For example, the weather service provider 110 may transmit a signal indicative of a category 3 storm to a particular zone irrespective as to the risk tolerance of the subscribers, e.g., dialing a single pager number to alert the entire zone associated with that pager number. The alert units 120 are preset such that only those alert units that are set to be responsive to a signal indicative of a storm achieving a category 3 level or above will activate (e.g., a red lighted LED), while other alert units will not trigger (e.g., a yellow lighted LED). This embodiment further reduces the number of pager numbers to be dialed, since the weather service provider 110 will be required to broadcast weather or hazardous condition alerts only with regard to subscriber zones, and not the parameters of the weather or hazardous conditions. This embodiment further accelerates the broadcast of alert signals to subscribers, thereby allow the subscribers more time to react.

It should be apparent to those skilled in the art that a novel method for personally warning individuals of a severe weather or hazardous condition has been provided. The method and apparatus inventively utilizes existing government infrastructure to personally warn individuals in possible danger from severe weather conditions. Additionally, the invention provides wireless ability to activate the alert unit. Furthermore, the invention is compact in size and may be powered by plugging the apparatus directly into a standard 115 Volt A/C wall socket. Finally, the alert unit has a power back-up provision in the form of a conventional D/C battery, thereby allowing for continued monitoring in the event of a power outage by the local power utilities or the power lines.

Although various embodiments that incorporate the teachings of the present invention have been shown and described in detail herein, those skilled in the art can readily devise many other varied embodiments that still incorporate these teachings.

What is claimed is:

1. A method for notifying a subscriber of a weather or hazardous condition, said method comprising the steps of:
  (a) transmitting a weather or hazardous condition signal via a weather service provider to the subscriber, wherein said transmitting step (a) transmits said weather or hazardous signal by using a region-based paging number for a specific region of subscribers; and
  (b) passively alerting said subscriber of said weather or hazardous condition upon receiving said weather or hazardous signal via an alert unit, where said at least one passive alert unit will only activate if said weather or hazardous condition signal is indicative of a weather or hazardous condition threshold level as defined by the subscriber.

2. An alert system for notifying a subscriber of a weather or hazardous condition, said alert system comprising:
  a weather service provider for detecting a weather or hazardous condition, wherein said weather service provider transmits a weather or hazardous condition signal to the subscriber to alert the subscriber of the weather or hazardous condition; and
  at least one passive alert unit for receiving said weather or hazardous condition signal, where said at least one passive alert unit will only activate if said weather or hazardous condition signal is indicative of a weather or hazardous condition threshold level as defined by the subscriber, wherein said weather or hazardous condition signal is transmitted via a paging system, where said weather or hazardous condition signal is transmitted by using a region-based paging number.

3. The alert system of claim 2, wherein said weather service provider further comprises:
  a database for storing subscriber information, wherein said subscriber information comprises said weather or hazardous condition threshold level.

4. A method for notifying a subscriber of a weather or hazardous condition, said method comprising the steps of:
  (a) transmitting a weather or hazardous condition signal via a weather service provider to the subscriber via a wireless communication system, wherein said transmitting step (a) transmits said weather or hazardous signal by using a region-based paging number for a specific region of subscribers,
  wherein said transmitting step (a) comprises the steps of:
    (a1) identifying a weather or hazardous condition in accordance with a weather or hazardous condition threshold level;
    (a2) identifying a subscriber having a weather or hazardous condition threshold level matching said weather or hazardous condition; and
    (a3) only transmitting said weather or hazardous condition signal to said identified subscriber; and
  (b) passively alerting said subscriber of said weather or hazardous condition upon receiving said weather or hazardous signal via an alert unit.

5. The method of claim 4, wherein said wireless communication system of transmitting step (a) is a pager system.

6. The method of claim 4, wherein said weather or hazardous condition signal is formulated from information received from a weather tracking source.

7. An alert system for notifying a subscriber of a weather or hazardous condition, said alert system comprising:
  at least one passive alert unit for warning the subscriber of the weather or hazardous condition;
  a weather service provider for detecting a weather or hazardous condition, wherein said weather service provider transmits a weather or hazardous condition signal via a wireless communication system to said at least one passive alert unit to alert the subscriber of the weather or hazardous condition, wherein said wireless communication system is a paging system, where said weather or hazardous condition signal is transmitted by using a region-based paging number, and a database for storing subscriber information, wherein said subscriber information comprises a weather or hazardous condition threshold level.

8. The alert system of claim 7, wherein said at least one alert unit comprises:

a receiver; and at least one alarm indicator, coupled to said receiver, for providing a warning signal to alert said subscriber of said weather or hazardous condition.

9. The alert system of claim 7, wherein said alert unit is a voice evacuation system.

10. The alert system of claim 8, wherein said warning signal comprises a visual signal generated by a strobe light.

11. The alert system of claim 8, wherein said warning signal comprises an audible signal generated by a horn.

12. The alert system of claim 8, wherein said alert unit further comprises a display for displaying said weather or hazardous condition to said subscribers.

13. The alert system of claim 12, wherein said display comprises: a liquid crystal display for displaying alphanumeric text representing said weather or hazardous condition.

14. The alert system of claim 12, wherein said display comprises: at least one light emitting diode (LED) representing said weather or hazardous condition.

* * * * *